UNITED STATES PATENT OFFICE 2,652,425

OXYPROPYLATED FRACTIONAL ESTERS OF POLYCARBOXYLIC ACIDS

Melvin De Groote, University City, Mo., assignor to Petrolite Corporation, a corporation of Delaware No Drawing. Application May 14, 1951,
Serial No. 226,333

7 Claims. (Cl. 260—475)

The present invention is concerned with certain new chemical products, compounds, or compositions which have useful application in various arts. It includes methods or procedures for manufacturing said new chemical products, compounds, or compositions, as well as the products, compounds, or compositions themselves.

Said new compositions are fractional esters obtained from a polycarboxy acid and a diol obtained by the oxypropylation of a primary alicyclic amine having not more than 7 carbon atoms and containing a cyclohexyl radical. For all practical purposes, this limits the amine to products obtained by the hydrogenation of aniline, benzylamine, and a toluidine, such as orthotoluidine. Such compounds are cyclohexylamine, methylcyclohexylamine, and cyclohexylmethylamine. Furthermore, the dihydroxylated compound, prior to esterification, must be water-insoluble and kerosene-soluble. Momentarily, ignoring certain variants of structure, which will be considered subsequently, the compounds may be exemplified by the following formula:

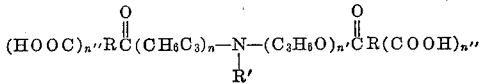

in which R' is the cyclohexyl radical, the methylcyclohexyl radical, or the cyclohexylmethyl radical, and $n$ and $n'$ are whole numbers with the proviso that $n$ plus $n'$ equals a sum varying from 15 to 80; $n''$ is a whole number not over 2, and R is the radical of the polycarboxy acid.

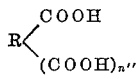

and preferably free from any radical having more than 8 uninterrupted carbon atoms in a single group, and with the further proviso that the parent dihydroxy compound, prior to esterification, be water-insoluble and kerosene-soluble.

Attention is directed to the co-pending application of Charles M. Blair, Jr., Serial No. 70,811, filed January 13, 1949 (now Patent 2,562,878, granted August 7, 1951), in which there is described, among other things, a process for breaking petroleum emulsions of the water-in-oil type characterized by subjecting the emulsion to the action of an esterification product of a dicarboxylic acid and a polyalkylene glycol, in which the ratio of equivalents of polybasic acid to equivalents of polyalkylene glycol is in the range of 0.5 to 2.0, in which the alkylene group has from 2 to 3 carbon atoms, and in which the molecular weight of the product is between 1,500 to 4,000.

Similarly, there have been used esters of dicarboxy acids and polypropylene glycols, in which 2 moles of the dicarboxy acid ester have been reacted with one mole of a polypropylene glycol having a molecular weight, for example, of 2,000 so as to form an acidic fractional ester. Subsequent examination of what is said herein, in comparison with the previous example as well as the hereto appended claims, will show the line of delineation between such somewhat comparable compounds. Of greater significance, however, is what is said subsequently in regard to the structure of the parent diol, as compared to polypropylene glycols whose molecular weights may vary from 1,000 to 2,000.

The cheapest of the three amines which can be employed is cyclohexylamine and this is my preferred reagent.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in my co-pending application Serial No. 226,332, filed May 14, 1951.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes; as lubricants, etc.

For convenience, what is said hereinafter will be divided into four parts:

Part 1 is concerned with the preparation of the oxypropylation derivatives of the specified amines;

Part 2 is concerned with the preparation of the esters from the oxypropylated derivatives;

Part 3 is concerned with the structure of the oxypropylation products obtained from the specified alicyclic amines. Insofar that such materials are dihydroxylated, there is a relationship to ordinary diols which do not contain a nitrogen atom, all of which is considered briefly in this particular part; and Part 4 is concerned with certain derivatives which can be obtained from the oxypropylated primary amines. In some instances, such derivatives are obtained by modest oxyethylation preceding the oxypropylation step, or oxypropylation followed by oxyethylation. This results in diols having somewhat different properties which can then be reacted with the same polycarboxy acids or anhydrides described in Part 3 to give effective demulsifying agents. For this reason, a description of the apparatus makes casual mention of oxyethylation. For the same reason there is brief mention of the use of glycide.

PART 1

For a number of well known reasons equipment, whether laboratory size, semi-pilot plant size, pilot plant size, or large scale size, is not, as a rule, designed for a particular alkylene oxide. Invariably and inevitably, however, or particularly in the case of laboratory equipment and pilot plant size, the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water, or slightly above, as, for example, 95° to 120° C. Under such circumstances, the pressure will be less than 30 pounds per square inch, unless some special procedure is employed, as is sometimes the case, to wit, keeping an atmosphere of inert gas such as nitrogen in the vessel during the reaction. Such low-temperature-low-reaction-rate oxypropylations have been described very completely in U. S. Patent No. 2,448,664, to H. R. Fife et al., dated September 7, 1948. Low-temperature-low-pressure-oxypropylations are particularly desirable where the compound being subjected to oxypropylation contains one, two or three points of reaction only, such as monohydric alcohols, glycols and triols.

Although the word "glycol" or "diol" is usually applied to compounds containing carbon, hydrogen, and oxygen only, yet the nitrogen-containing compounds herein are diols in the sense that they are dihydroxylated. Thus, the conditions which apply to the oxypropylation of certain glycols also apply in this instance.

Since low-pressure-low-temperature-low-reaction speed oxypropylations require considerable time, for instance, 1 to 7 days of 24 hours each to complete the reaction, they are conducted, as a rule, whether on a laboratory scale, pilot plant scale, or large scale, so as to operate automatically. The prior figure of seven days applies especially to large-scale operations. I have used conventional equipment with two added automatic features:

(a) A solenoid-controlled valve which shuts off the propylene oxide in event that the temperature gets outside a predetermined and set range, for instance, 95° to 120° C.; and (b) Another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose, where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant equipment which is designed to permit continuous oxyalkylations, whether it be oxypropylation or oxyethylation. With certain obvious changes, the equipment can be used also to permit oxyalkylation involving the use of glycide, where no pressure is involved except the vapor pressure of a solvent, if any, which may have been used as a diluent.

As previously pointed out, the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous, automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes, unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and preferably, coils in addition thereto, with the jacket so arranged that it is suitable for heating with steam or cooling with water, and further equipped with electrical heating devices. Such autoclaves are, of course, in essence, small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances, a larger bomb was used, to wit, one having a capacity of about one gallon. This bomb was equipped, also with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer, connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range, or if pressure in the autoclave passes out of predetermined range.

With this particular arrangement practically all oxypropylations become uniform, in that the reaction temperature was held within a few degrees of any selected point, for instance, if 105° C. was selected as the operating temperature the maximum point would be at the most 110° C. or 112° C., and the lower point would be 95°, or possibly, 98° C. Similarly, the pressure was held at approximately 30 pounds maximum within a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances, the reaction may take place in considerably less time, i. e., 24 hours or less, as far as a partial oxypropylation is concerned. The minimum time recorded was about a 3-hour period in a single step. Reactions indicated as being complete in 10 hours may have been complete in a lesser period of time, in light of the automatic equipment employed. This applies also where the reactions were complete in a shorter period of time, for instance, 4 to 5 hours. In the addition of propylene oxide, in the autoclave equipment as far as possible the valves were set so all the propylene oxide, if fed continuously, would be added at a rate so that the predetermined amount would react within the first 15 hours of the 24-hour period or two-thirds of any shorter period. This meant that if the reaction was interrupted automatically for a period of time for pressure to drop or temperature to drop the predetermined amount of oxide, would still be added, in most instances, well within the predetermined time period. Sometimes where the addition was a comparatively small amount in a 10-hour period, there would be an unquestionable speeding up of the reaction, by simply repeating the examples and using 3, 4, or 5 hours, instead of 10 hours.

When operating at a comparatively high temperature, for instance, between 150° to 200° C., an unreacted alkylene oxide such as propylene oxide, makes its presence felt in the increase in pressure, or the consistency of a higher pressure. However, at a low enough temperature it may happen that the propylene oxide goes in as a liquid. If so, and if it remains unreacted, there is, of course, an inherent danger and appropriate steps must be taken to safeguard against this possibility; if need be, a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight, the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature, even in large scale operations, as much as a week or ten days' time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction, the scale movement through a time operating device was set for either one to two hours, so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic, insofar that the feed stream was set for a slow, continuous run which was shut off in case the pressure passed a predetermined point, as previously set out. All the points of design, construction, etc., were conventional, including the gauges, check valves and entire equipment. As far as I am aware, at least two firms, and possibly three, specialize in autoclave equipment, such as I have employed in the laboratory, and are prepared to furnish equipment of this same kind. Similarly, pilot plant equipment is available. This point is simply made as a precaution in the direction of safety. Oxyalkylations, particularly involving ethylene oxide, glycide, propylene oxide, etc., should not be conducted except in equipment specifically designed for the purpose.

*Example 1a*

Of the various alicyclic compounds previously enumerated, the one which is most readily available commercially is cyclohexylamine. Although the other alicyclic amines would be equally satisfactory and react in the same manner, I have preferred to use cyclohexylamine for purpose of illustration, because of its ready availability.

The starting material was a commercial grade of cyclohexylamine as sold by Monsanto Chemical Company, St. Louis, Missouri. The particular autoclave employed was one with a capacity of 15 gallons, or on the average of about 120 pounds of reaction mass. The speed of the stirrer could be varied from 150 to 350 R. P. M. 15.25 pounds of cyclohexylamine were charged into the autoclave along with 1½ pounds of caustic soda. The reaction pot was flushed out with nitrogen; the autoclave sealed, and the automatic devices adjusted for injecting a total of 79 pounds of propylene oxide in approximately a five-hour period. The regulator was set for a maximum pressure of 37 pounds per square inch. This meant that the bulk of the reaction could take place, and probably did take place, at a lower pressure. This comparatively lower pressure was the result of the fact that considerable catalyst was present, especially when one allows for the fact that the cyclohexylamine as such has some basicity of its own. The addition of propylene oxide was fairly slow, for instance, about 20 pounds per hour. The addition was made at a temperature of 220°–225° F., that is, somewhat moderately above the boiling point of water. The initial introduction of propylene oxide was not made until the heating devices had raised the temperature somewhat above the boiling point of water, for instance, about 217° or 218° F., that is, slightly higher than 100° C. At the completion of the reaction, a sample was taken and oxypropylation proceeded as in Example 2a, immediately following.

*Example 2a*

61.1 pounds of the reaction mass identified as Example 1a, preceding, and equivalent to 9.75 pounds of the amine, 50.4 pounds of propylene oxide, and .95 pound of caustic soda, were allowed to remain in the reaction vessel and without adding any more catalyst subjected to reaction with 11.75 pounds of propylene oxide. The oxypropylation was conducted in substantially the same manner with regard to temperature and pressure, as in Example 1a, preceding, except that the reaction time was short, i. e., 3 hours. The oxide was added at about the rate of 5 pounds per hour. At the end of the reaction period, part of the sample was withdrawn and oxypropylation was continued as described in Example 3a, following.

*Example 3a*

65.1 pounds of the reaction mass identified as Example 2a, preceding, and equivalent to 8.71 pounds of cyclohexylamine, 55.54 pounds of propylene oxide, and .85 pound of caustic soda, were permitted to remain in the reaction vessel. 25 pounds of propylene oxide were introduced in this third stage. No additional catalyst was added. The time required was the same as in the preceding period, i. e., 3 hours. The addition was at the rate of about 10 pounds per hour. The conditions of reaction, as far as temperature and pressure were concerned, were substantially the same as in Example 1a, preceding. At the completion of the reaction, part of the reaction mass was withdrawn and the remainder subjected to oxypropylation, as described in Example 4a, immediately following.

*Example 4a*

61.72 pounds of the reaction mass identified as Example 3a, preceding, and equivalent to 5.96 pounds of cyclohexylamine, 55.18 pounds of propylene oxide, and .58 pound of caustic soda were permitted to remain in the autoclave. Without adding any more catalyst this was subjected to further oxypropylation in the same manner as in preceding examples. The amount of propylene oxide added was 43 pounds. This was added in a 3-hour period at a rate of about 17 to 18 pounds per hour. Conditions in regard to temperature and pressure were substantially the same as in Example 1a, preceding. At the end of the reaction period part of the sample was withdrawn and the remainder of the reaction mass was subjected to further oxypropylation, as described in Example 5a, following.

*Example 5a*

67.2 pounds of the reaction mass identified as Example 4a, preceding, were permitted to remain in the autoclave. This was equivalent to 3.9 pounds of cyclohexylamine, 62.95 pounds of propylene oxide, and .37 pound of caustic soda. 37.25 pounds of propylene oxide were added. The time required to add this propylene oxide was considerably longer than previously, to wit, 8 hours. This was due, in part, to the lower concentration of catalyst. The oxide was added at the rate of about 6 pounds per hour. The conditions of reaction in regard to temperature and pressure were substantially the same as in Example 1a, preceding. Part of the reaction mass was withdrawn and the remainder subjected to further oxypropylation, as described in Example 6a, immediately following.

*Example 6a*

67.8 pounds of reaction mass identified as Example 5a, preceding, and equivalent to 2.53 pounds of cyclohexylamine, 65.03 pounds of propylene oxide, and .24 pound of caustic soda were subjected to further oxypropylation. No additional catalyst was introduced. 32.5 pounds of propylene oxide were added. The addition was made under the same conditions as in Example 5a, preceding, i. e., 8 hours for addition of the oxide, with temperature and pressure the same as in Example 1a, preceding; and also, for that matter, the same as in Example 5a, preceding. The oxide was added at a rate of about 5 pounds per hour. When the reaction was complete, part of the mass was withdrawn and the remainder subjected to further oxypropylation, as described in Example 7a, immediately following.

*Example 7a*

64.55 pounds of reaction mass equivalent to 1.67 pounds of cyclohexylamine, 62.73 pounds of propylene oxide, and .15 pound of caustic soda, were subjected to further oxypropylation without the addition of any catalyst. The amount of oxide added was 12.5 pounds; the addition rate was rather slow, being at the rate of 4 pounds per hour. The oxypropylation was complete in 4 hours. The conditions of temperature and pressure were the same as in Example 1a, preceding.

*Example 8a*

55.68 pounds of reaction mass identified as Example 7a, preceding, equivalent to 1.21 pounds of cyclohexylamine, 54.36 pounds of propylene oxide, and .11 pound of caustic soda, were subjected to further oxypropylation without the addition of any catalyst. The amount of oxide added was 39.25 pounds. Due to the low concentration of catalyst, the addition was rather slow, at the rate of about 4½ pounds per hour. The time required to add the oxide was 10 hours. The conditions, as far as temperature and pressure were concerned, were the same as in Example 1a, preceding.

In this particular series of examples the oxypropylation was stopped at this stage. In other series I have continued the oxypropylation, so that the theoretical molecular weight varied from 9,000 to 10,000, but the increase in molecular weight by hydroxyl determination was comparatively small, for instance, about 150 to 200.

What is said herein is presented in tabular form in Table 1, immediately following, with some added information as to molecular weight and as to solubility of the reaction product in water, xylene and kerosene.

factorily as an index to the molecular weight as any other procedure, subject to the above limitations, and especially in the higher molecular weight range. If any difficulty is encountered in the manufacture of the esters, as described in Part 2, the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 2

As previously pointed out, the present invention is concerned with acidic esters obtained from the oxypropylated derivatives described in Part 1, immediately preceding, and polycarboxy acids, particularly tricarboxy acids, like citric and dicarboxy acids such as adipic acid, phthalic acid, or anhydride, succinic acid, diglycollic acid, se-

TABLE I

| Ex No. | Composition before | | | Composition at end | | | | M. W. by hyd. determin. | Max. temp., °F. | Max. Pres., lbs. sq. in. | Time, hrs. |
|---|---|---|---|---|---|---|---|---|---|---|---|
| | Amine amt., lbs. | Oxide amt., lbs. | Catalyst, lbs. | Theo. Mol. wt. | Amine amt., lbs. | Oxide amt., lbs. | Catalyst, lbs. | | | | |
| 1a | 15.25 | | 1.50 | 600 | 15.25 | 79.0 | 1.50 | | 220–225 | 35.37 | 5 |
| 2a | 9.75 | 50.4 | .95 | 730 | 9.75 | 62.15 | .95 | | 220–225 | 35.37 | 3 |
| 3a | 8.71 | 55.54 | .85 | 1,015 | 8.71 | 80.54 | .85 | | 220–225 | 35.37 | 3 |
| 4a | 5.96 | 55.18 | .58 | 1,730 | 5.96 | 98.18 | .58 | 1,486 | 220–225 | 35.37 | 3 |
| 5a | 3.90 | 62.95 | .37 | 2,640 | 3.90 | 100.2 | .37 | 1,810 | 220–225 | 35.37 | 8 |
| 6a | 2.53 | 65.03 | .24 | 3,830 | 2.53 | 95.28 | .24 | 2,380 | 220–225 | 35.37 | 8 |
| 7a | 1.67 | 62.73 | .15 | 4,560 | 1.67 | 75.23 | .15 | 2,170 | 220–225 | 35.37 | 4 |
| 8a | 1,21 | 54.36 | .11 | 7,770 | 1.21 | 93.61 | .11 | 2,920 | 220–225 | 35.37 | 10 |

Examples 1a, 2a and 3a were emulsifiable to insoluble in water, and soluble in kerosene and xylene. Examples 4a, through 8a, inclusive, were all insoluble in water, but soluble in xylene and kerosene.

Products obtained from hydrogenated benzylamine and hydrogenated orthotoluidine appear to have approximately the same characteristics as those derived from cyclohexylamine. The final product, i. e., at the end of the oxypropylation step, was a somewhat viscous liquid with a reddish-amber cast. This was characteristic of all the various products obtained from the three amines. These products were, of course, slightly alkaline, due to the residual caustic soda and also due to the basic nitrogen atom, which is significant, at least in the case of benzylamine. The residual basicity, due to the catalyst, would, of course, be the same if sodium methylate had been used.

Speaking of insolubility in water or solubility in kerosene, such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances, the acetyl value or hydroxyl value serves as satisbacic acid, azelaic acid, aconitic acid, maleic acid or anhydride, citraconic acid or anhydride, maleic acid or anhydride adducts, as obtained by the Diels-Alder reaction from products such as maleic anhydride, and cyclopentadiene. Such acids should be heat-stable so they are not decomposed during esterification. They may contain as many as 36 carbon atoms, as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy, it is customary to use either the acid or the anhydride. A conventional procedure is employed. On a laboratory scale one can employ a resin pot of the kind described in U. S. Patent No. 2,499,370, dated March 7, 1950, to DeGroote & Keiser, and particularly with one more opening to permit the use of a porous spreader if hydrochloric acid gas is to be used as a catalyst. Such device or absorption spreader consists of minute alundum thimbles which are connected to a glass tube. One can add a sulfonic acid such as paratoluene sulfonic acid as a catalyst. There is some objection to this, because, in some instances, there is some evidence that this acid catalyst tends to decompose or rearrange the oxypropylated compounds, and particularly likely to do so, if the esterification temperature is too high. In the case of polycarboxy acids such as diglycollic acid, which is strongly acidic, there is no need to add any catalyst. The use of hydrochloric acid gas has one advantage over para-toluene sulfonic acid and that is that at the end of the reaction, it can be removed by flushing out with nitrogen, whereas, there is no reasonably convenient means available of removing the para-toluene sulfonic acid or other sulfonic acid employed. If hydrochloric acid is employed, one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the diol, as described in the final procedure just preceding Table 2.

The products obtained in Part 1 preceding may contain a basic catalyst. As a general procedure, I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage, needless to say, a second filtration may be required. In any event, the neutral or slightly acidic solution of the oxypropylated derivatives described in Part 1 is then diluted further with sufficient xylene, decalin, petroleum solvent, or the like, so that one has obtained approximately a 45% solution. To this solution there is added a polycarboxylated reactant, as previously described, such as phthalic anhydride, succinic acid or anhydride, diglycollic acid, etc. The mixture is refluxed until esterification is complete, as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent, or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear somewhat viscous, reddish amber liquid so obtained may contain a small amount of sodium sulfate or sodium chloride, but, in any event, is perfectly acceptable for esterification in the manner described.

It is to be pointed out that the products here described are not polyesters in the sense that there is a plurality of both diol radicals and acid radicals; the product is characterized by having only one diol radical.

In some instances, and, in fact, in many instances, I have found that, in spite of the dehydration methods employed above, a mere trace of water still comes through and that this mere trace of water certainly interferes with the acetyl or hydroxyl value determination, at least when a number of conventional procedures are used, and may retard esterification, particularly where there is no sulfonic acid or hydrochloric acid present as a catalyst. Therefore, I have preferred to use the following procedure: I have employed about 200 grams of the diol, as described in Part 1, preceding; I have added about 60 grams of benzene, and then refluxed this mixture in the glass resin pot, using a phase-separating trap until the benzene carried out all the water present as water of solution or the equivalent. Ordinarily, this refluxing temperature is apt to be in the neighborhood of 130° to possibly 150° C. When all this water or moisture has been removed, I also withdraw approximately 20 grams or a little less benzene, and then add the required amount of the carboxy reactant and also about 150 grams of a high boiling aromatic petroleum solvent. These solvents are sold by various oil refineries, and, as far as solvent effect, act as if they were almost completely aromatic in character. Typical distillation data in the particular type I have employed and found very satisfactory is the following:

I. B. P., 142° C.       50 ml., 242° C.
5 ml., 220° C.          55 ml., 244° C.
10 ml., 209° C.         60 ml., 248° C.
15 ml., 215° C.         65 ml., 252° C.
20 ml., 216° C.         70 ml., 252° C.
25 ml., 220° C.         75 ml., 260° C.
30 ml., 225° C.         80 ml., 264° C.
35 ml., 230° C.         85 ml., 270° C.
40 ml., 234° C.         90 ml., 280° C.
45 ml., 237° C.         95 ml., 307° C.

After this material is added, refluxing is continued, and, of course, is at a high temperature, to wit, about 160° to 170° C. If the carboxy reactant is an anhydride, needless to say, no water of reaction appears; if the carboxy reactant is an acid, water of reaction should appear and should be eliminated at the above reaction temperature. If it is not eliminated, I simply separate out another 10 to 20 cc. of benzene by means of the phase-separating trap, and thus raise the temperature to 180° or 190° C., or even to 200° C., if need be. My preference is not to go above 200° C.

The use of such solvent is extremely satisfactory, provided one does not attempt to remove the solvent subsequently except by vacuum distillation, and provide there is no objection to a little residue. Actually, when these materials are used for a purpose such as demulsification, the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In the appended table, solvent #7-3, which appears in all instances, is a mixture of 7 volumes of the aromatic petroleum solvent, previously described, and 3 volumes of benzene. This was used, or a similar mixture, in the manner previously described. In a large number of similar examples decalin has been used, but it is my preference to use the above mentioned mixture, and particularly with the preliminary step of removing all the water. If one does not intend to remove the solvent, my preference is to use the petroleum solvent, benzene mixture, although obviously, any of the other mixtures, such as decalin and xylene, can be employed.

The data included in the subsequent tables, i. e., Tables 2 and 3, are self-explanatory, and very complete and it is believed no further elaboration is necessary:

TABLE 2

| Ex. No. of acid ester | Ex. No. of oxy. cmpd. | Theo. M. W. of H. C. | Theo. hydroxyl V of H. C. | Actual hydroxyl value | Mol. wt. based on actual H. V. | Amt. of hyd. cmpd. (grs.) | Polycarboxy reactant | Amt. of polycarboxy reactant (grs.) |
|---|---|---|---|---|---|---|---|---|
| 1b | 4a | 1,730 | 64.7 | 75.4 | 1,486 | 202 | Diglycollic acid | 36.2 |
| 2b | 4a | 1,730 | 64.7 | 75.4 | 1,486 | 204 | Phthalic anhydride | 40.5 |
| 3b | 4a | 1,730 | 64.7 | 75.4 | 1,486 | 201 | Maleic anhydride | 26.5 |
| 4b | 4a | 1,730 | 64.7 | 75.4 | 1,486 | 202 | Citraconic anhydride | 30.4 |
| 5b | 4a | 1,730 | 64.7 | 75.4 | 1,486 | 204 | Aconitic acid | 47.6 |
| 6b | 5a | 2,640 | 42.4 | 61.9 | 1,810 | 205 | Diglycollic acid | 30.2 |
| 7b | 5a | 2,640 | 42.4 | 61.9 | 1,810 | 204 | Phthalic anhydride | 33.4 |
| 8b | 5a | 2,640 | 42.4 | 61.9 | 1,810 | 205 | Maleic anhydride | 22.2 |
| 9b | 5a | 2,640 | 42.4 | 61.9 | 1,810 | 205 | Aconitic acid | 39.3 |
| 10b | 5a | 2,640 | 42.4 | 61.9 | 1,810 | 206 | Citraconic anhydride | 25.6 |
| 11b | 6a | 3,830 | 29.2 | 47.1 | 2,380 | 203 | Diglycollic acid | 22.8 |
| 12b | 6a | 3,830 | 29.2 | 47.1 | 2,380 | 203 | Phthalic anhydride | 25.2 |
| 13b | 6a | 3,830 | 29.2 | 47.1 | 2,380 | 202 | Maleic anhydride | 16.7 |
| 14b | 6a | 3,830 | 29.2 | 47.1 | 2,380 | 203 | Aconitic acid | 29.6 |
| 15b | 6a | 3,830 | 29.2 | 47.1 | 2,380 | 203 | Citraconic anhydride | 19.3 |
| 16b | 7a | 4,560 | 24.6 | 51.4 | 2,170 | 206 | Phthalic anhydride | 28.1 |
| 17b | 7a | 4,560 | 24.6 | 51.4 | 2,170 | 204 | Maleic anhydride | 18.5 |
| 18b | 7a | 4,560 | 24.6 | 51.4 | 2,170 | 203 | Citraconic anhydride | 21.0 |
| 19b | 7a | 4,560 | 24.6 | 51.4 | 2,170 | 205 | Aconitic acid | 32.7 |
| 20b | 7a | 4,560 | 24.6 | 51.4 | 2,170 | 205 | Diglycollic acid | 24.6 |
| 21b | 8a | 7,770 | 14.4 | 38.3 | 2,920 | 212 | ...do... | 19.4 |
| 22b | 8a | 7,770 | 14.4 | 38.3 | 2,920 | 210 | Phthalic anhydride | 21.1 |
| 23b | 8a | 7,770 | 14.4 | 38.3 | 2,920 | 203 | Maleic anhydride | 13.6 |
| 24b | 8a | 7,770 | 14.4 | 38.3 | 2,920 | 203 | Aconitic acid | 24.2 |
| 25b | 8a | 7,770 | 14.4 | 38.3 | 2,920 | 205 | Citraconic anhydride | 15.7 |

TABLE 3

| Ex. No. of acid ester | Solvent | Amt. solvent (grs.) | Esterification temp., °C. | Time of Esterification (hrs.) | Water out (cc.) |
|---|---|---|---|---|---|
| 1b | #7-3 | 233 | 171 | 3½ | 5.2 |
| 2b | #7-3 | 245 | 146 | 3½ | None |
| 3b | #7-3 | 228 | 147 | 4¼ | None |
| 4b | #7-3 | 240 | 156 | 1¼ | None |
| 5b | #7-3 | 247 | 202 | 3½ | 4.9 |
| 6b | #7-3 | 231 | 185 | 2½ | 4.1 |
| 7b | #7-3 | 237 | 138 | 3¾ | None |
| 8b | #7-3 | 226 | 138 | 2½ | None |
| 9b | #7-3 | 240 | 185 | 2 | 4.0 |
| 10b | #7-3 | 233 | 155 | 1¼ | None |
| 11b | #7-3 | 228 | 174 | 1¾ | 3.3 |
| 12b | #7-3 | 228 | 137 | 5½ | None |
| 13b | #7-3 | 220 | 140 | 3½ | None |
| 14b | #7-3 | 230 | 151 | 1¾ | 3.2 |
| 15b | #7-3 | 223 | 155 | 1¾ | .6 |
| 16b | #7-3 | 234 | 134 | 3½ | None |
| 17b | #7-3 | 222 | 132 | 3½ | None |
| 18b | #7-3 | 224 | 157 | 1¼ | None |
| 19b | #7-3 | 234 | 173 | 1¼ | 3.5 |
| 20b | #7-3 | 224 | 171 | 2 | 3.5 |
| 21b | #7-3 | 229 | 183 | 1¾ | 2.9 |
| 22b | #7-3 | 229 | 143 | 3 | None |
| 23b | #7-3 | 217 | 153 | 1¼ | None |
| 24b | #7-3 | 223 | 159 | 1½ | 2.4 |
| 25b | #7-3 | 221 | 168 | 1½ | .3 |

The procedure for manufacturing the esters has been illustrated by preceding examples. If, for any reason, reaction does not take place in a manner that is acceptable, attention should be directed to the following details:

(a) Recheck the hydroxyl or acetyl value of the oxypropylated primary amines of the kind specified and use a stoichiometrically equivalent amount of acid;

(b) If the reaction does not proceed with reasonable speed, either raise the temperature indicated, or else extend the period of time up to 12 or 16 hours, if need be;

(c) If necessary, use ½% of paratoluene sulfonic acid, or some other acid as a catalyst;

(d) If the esterification does not produce a clear product, a check should be made to see if an inorganic salt such as sodium chloride or sodium sulfate is not precipitating out.

Such salt should be eliminated, at least for exploration experimentation, and can be removed by filtering. Everything else being equal, as the size of the molecule increases and the reactive hydroxyl radical represents a smaller fraction of the entire molecule, more difficulty is involved in obtaining complete esterification.

Even under the most carefully controlled conditions of oxypropylation involving comparatively low temperatures and long time of reaction, there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances, an attempt to react the stoichiometric amount of a polycarboxy acid with the oxypropylated derivative results in an excess of the carboxylated reactant, for the reason that apparently under conditions of reaction, less reactive hydroxyl radicals are present than indicated by the hydroxyl value. Under such circumstances, there is simply a residue of the carboxylic reactant which can be removed by filtration, or, if desired, the esterification procedure can be repeated, using an appropriately reduced ratio of carboxylic reactant.

Even the determination of the hydroxyl value by conventional procedure leaves much to be desired, due, either to the cogeneric materials previously referred to, or, for that matter, the presence of any inorganic salts or propylene oxide. Obviously, this oxide should be eliminated.

The solvent employed, if any, can be removed from the finished ester by distillation, and particularly vacuum distillation. The final products or liquids are generally dark reddish amber to reddish amber in color, and show moderate viscosity. They can be bleached with bleaching clays, filtering chars, and the like. However, for the purpose of demulsification or the like, color is not a factor and decolorization is not justified.

In the above instances, I have permitted the solvents to remain present in the final reaction mass. In other instances, I have followed the same procedure, using decalin or a mixture of decalin or benzene in the same manner and ultimately removed all the solvents by vacuum distillation. Appearances of the final products are much the same as the diols before esterification, and in some instances, were somewhat darker in color and had a more reddish cast and perhaps somewhat more viscous.

PART 3

Previous reference has been made to the fact that diols (nitrogen-free compounds) such as polypropyleneglycol of approximately 2,000 molecular weight, for example, have been esterified with dicarboxy acids and employed as demulsifying agents. The herein described compounds are different from such diols, although both, it is true, are high molecular weight dihydroxylated compounds. The instant compounds have present a nitrogen atom which is basic in character. The basicity of such nitrogen atom may be decreased, due to the presence of the long alkylene oxide chain, but, in any event, it is quite possible that the orientation of the acid molecule, i. e., the acid ester, is influenced by the presence of the basic nitrogen atom. Stated another way, the ultimate ester has at least two free carboxy radicals. It seems reasonable to assume that the orientation of such molecules at an oil-water interface, for example, are affected by the presence of a nitrogen atom having significant or definite basicity. Regardless of what the difference may be, the fact still remains that the compounds of the kind herein described may be, and frequently are, 10%, 15%, or 20% better on a quantitative basis than the simpler compound previously described, and demulsify faster and give cleaner oil in many instances. The method of making such comparative tests has been described in a booklet entitled "Treating Oil Field Emulsions," used in the Vocational Training Course, Petroleum Industry Series, of the American Petroleum Institute.

It may be well to emphasize also the fact that oxypropylation does not produce a single compound, but a cogeneric mixture. The factor involved is the same as appears if one were oxypropylating a monohydric alcohol or a glycol. Momentarily, one may consider the structure of a polypropylene glycol, such as polypropylene glycol of 2,000 molecular weight. Propylene glycol has a primary alcohol radical and a secondary alcohol radical. In this sense the building unit which forms polypropylene glycols is not symmetrical. Obviously, then, polypropylene glycols can be obtained, at least theoretically, in which two secondary alcohol groups are united, or a secondary alcohol group is united to a primary alcohol group, etherization being involved, of course, in each instance.

Usually, no effort is made to differentiate between oxypropylation taking place, for example, at the primary alcohol radical, or the secondary alcohol radical. Actually, when such products are obtained, such as a high molal polypropylene glycol or the products obtained in the manner herein described, one does not obtain a single derivative such as $HO(RO)_nH$, in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified. For practical purposes, one need only consider the oxypropylation of a monohydric alcohol, because, in essence, this is substantially the mechanism involved. Even in such instances where one is concerned with a monohydric reactant, one cannot draw a single formula and say that by following such procedure, one can readily obtain 80% or 90% or 100% of such compound. However, in the case of at least monohydric initial reactants, one can readily draw the formulas of a large number of compounds which appear in some of the probable mixtures, or can be prepared as components and mixtures which are manufactured conventionally.

Simply by way of illustration, reference is made to the co-pending application of DeGroote, Wirtel and Pettingill, Serial No. 109,791, filed August 11, 1949.

However, momentarily referring again to a monohydric initial reactant, it is obvious that if one selects any such simple hydroxylated compound and subjects such compound to oxyalkylation, such as oxyethylation, or oxypropylation, it becomes obvious that one is really producing a polymer of the alkylene oxides, except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent, which, for the sake of convenience, may be indicated as $RO(C_2H_4O)_{30}H$. Indeed, one obtains a cogeneric mixture of closely related homologues, in which the formula may be shown as the following, $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric, closely related series of touching homologous compounds. Considerable investigation has been made in regard to the distribution curves for linear polymers. Attention is directed to the article entitled "Fundamental Principles of Condensation Polymerization," by Flory, which appeared in Chemical Reviews, volume 39, No. 1, page 137.

Unfortunately, as has been pointed out by Flory, and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration, and how to repeat such production time after time without difficulty, it is necessary to resort to some other method of description, or else consider the value of $n$, in formulas such as those which have appeared previously and which appear in the claims, as representing both individual constituents in which $n$ has a single definite value, and also with the understanding that $n$ represents the average statistical value, based on the assumption of completeness of reaction.

This may be illustrated as follows: Assume that in any particular example the molal ratio of the propylene oxide to cyclohexylamine or other specified primary amines is 30 to 1. Actually, one obtains products in which $n$ probably varies from 10 to 20, perhaps even farther. The average value, however, is 15, assuming, as previously stated, that the reaction is complete. The product described by the formula is best described also in terms of method of manufacture.

PART FOUR

Previous reference has been made to oxyalkylating agents other than propylene oxide, such as ethylene oxide. Obviously, variants can be prepared which do not depart from what is said herein but do produce modifications. Cyclohexylamine or other suitable alicyclic amines can be reacted with ethylene oxide in modest amounts and then subjected to oxypropylation, provided that the resultant derivative is (a) water-insoluble; (b) kerosene-soluble, and (c) has present 15 to 80 alkylene oxide radicals. Needless to say, in order to have water-insolubility and kerosene-solubility, the large majority must be propylene oxide. Other variants suggest themselves, as, for example, replacing propylene oxide by butylene oxide.

More specifically, one mole of cyclohexylamine can be treated with 2, 4, or 6 moles of ethylene oxide and then treated with propylene oxide so as to produce a water-insoluble, kerosene-soluble oxyalkylated cyclohexylamine in which there are present 15 to 80 propylene oxide radicals, as previously specified. Similarly, the propylene oxide can be added first and then the ethylene oxide, or random oxyalkylation can be employed, using a mixture of the two oxides. The compounds so obtained are readily esterified in the same manner as described in Part 2, preceding. Incidentally, the diols described in Part 1 or the modifications described therein, can be treated with various reactants, such as glycide, epichlorohydrin, dimethyl sulfate, sulfuric acid, maleic anhydride, ethylene imine, etc. If treated with epichlorohydrin or monochloroacetic acid, the resultant product can be further reacted with a tertiary amine such as pyridine, or the like, to give quaternary ammonium compounds. If treated with maleic anhydride to give a total ester, the resultant can be treated with sodium bisulfite to yield a sulfosuccinate. Sulfo groups can be introduced also by means of a sulfating agent, as previously suggested, or by treating the chloroacetic acid resultant with sodium sulfite.

I have found that if such hydroxylated compound or compounds are reacted further so as to produce entirely new derivatives, such new derivatives have the properties of the original hydroxylated compound, insofar that they are effective and valuable demulsifying agents for resolution of water-in-oil emulsions, as found in the petroleum industry, as break inducers in doctor treatment of sour crude, etc.

Having thus described my invention, what I claim as new and desire to secure by Letters Patent is:

1. Hydrophile synthetic products; said hydrophile synthetic products being characterized by the following formula:

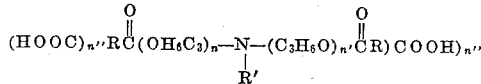

in which R' is a hydrocarbon radical selected from the class consisting of cyclohexyl radicals, methylcyclohexyl radicals, and cyclohexylmethyl radicals, and $n$ and $n'$ are whole numbers, with the proviso that $n$ plus $n'$ equals a sum varying from 15 to 80; $n''$ is a whole number not over 2 and R is the radical of a polycarboxy acid selected from the group consisting of acyclic and isocyclic polycarboxy acids having not more than 8 carbon atoms and composed of carbon, hydrogen and oxygen of the formula:

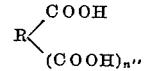

in which $n''$ has its previous significance.

2. Hydrophile synthetic products; said hydrophile synthetic products being characterized by the following formula:

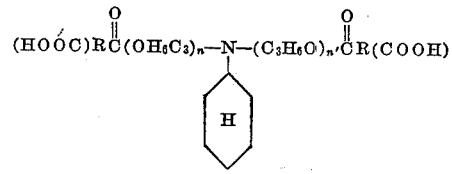

in which $n$ and $n'$ are whole numbers, with the proviso that $n$ plus $n'$ equals a sum varying from 15 to 80; and R is the radical of a dicarboxy acid selected from the group consisting of acyclic and isocyclic dicarboxy acids having not more than 8 carbon atoms and composed of carbon, hydrogen and oxygen of the formula:

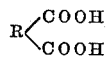

3. The product of claim 2, wherein the dicarboxy acid is phthalic acid.
4. The product of claim 2, wherein the dicarboxy acid is maleic acid.
5. The product of claim 2, wherein the dicarboxy acid is succinic acid.
6. The product of claim 2, wherein the dicarboxy acid is citraconic acid.
7. The product of claim 2, wherein the dicarboxy acid is diglycollic acid.

MELVIN X DE GROOTE.
his mark

Witnesses to mark:
W. C. ADAMS,
I. S. DE GROOTE.

No references cited.